Feb. 24, 1959  R. F. ZUMWALT  2,874,954

LIQUID SPRING

Filed Sept. 21, 1956

INVENTOR.
ROBERT F. ZUMWALT

BY *Schlesinger*

ATTORNEY

United States Patent Office 2,874,954
Patented Feb. 24, 1959

2,874,954
LIQUID SPRING

Robert F. Zumwalt, Tonawanda, N. Y., assignor to George F. Wales, Kenmore, N. Y.

Application September 21, 1956, Serial No. 611,243

6 Claims. (Cl. 267—1)

The present invention relates generally to liquid springs, and, more particularly, to liquid springs intended to absorb a severe, quick shock load.

A typical application of the invention is in a buffer or shock absorber for a gun mounting, where a spring may be required to absorb repeated impacts of great magnitude. In such applications, it is extremely important that the piston be maintained at all times in alignment with the bore in which it reciprocates and that it be held against cocking. If there is any deviation from the proper alignment or any tendency to cock, there will be uneven wear and the tremendous forces exerted on the piston will soon render the misaligned device completely useless.

In the conventional liquid spring, the liquid-containing chamber is formed in a generally cup-shaped body, which is closed at one end by a plug that is formed with a centrally disposed guide cylinder that opens into the chamber. The plug is brazed to the body, and a piston reciprocates in the guide cylinder of the plug. The piston carries a seal which has liquid-tight engagement with the guide cylinder. The rod or stem of the piston projects outwardly out of the plug to receive the load. Movement of the piston outwardly of the plug is limited by a sealing bushing which is held in place in the outer end of the guide cylinder by a nut that is threaded on the plug and which engages the seal on the piston.

In this conventional construction, the seal on the piston, which engages the wall of the guide cylinder, and the sealing bushing, which engages the piston rod or stem, are the sole means for guiding the piston in its reciprocating movement, and for maintaining the piston truly centered in the bore of the guide cylinder.

Furthermore, in the conventional spring, the whole pressure built up in the liquid must be taken by the body and by the braze which holds the plug in the body. Under severe shock loads, the body may bulge and fatigue may eventually occur in the braze, with the result that the braze may give way and the plug may "pop" out of the body.

One object of the present invention is to provide an improved liquid spring in which a better bearing and better guiding of the piston are assured to minimize the effect of wear on the piston seal and to maintain proper alignment of the piston in the cylinder throughout the life of the spring.

Another object of the invention is to provide a liquid spring construction which will permit a longer brazed joint between the closure plug and the wall of the liquid container thereby substantially to obviate any possibility of the plug popping out of the container.

A further object of the invention is to provide an improved liquid spring capable of absorbing tremendous impacts over a short stroke length.

Still another object of the invention is to provide a liquid spring of the character described which is of simplified construction and which has relatively few parts, and which is adapted to absorb repeated forces of great magnitude applied over a short stroke.

Yet another object of the invention is to provide an improved liquid spring construction that permits the use of lightweight material for the head of the piston.

A related object of the invention is to provide a liquid spring having a totally enclosed piston, characterized by the absence of the usual protruding unsupported stem.

These and other objects of the invention, which will be apparent hereinafter from the disclosure and from the recital of the appended claims, are achieved by the liquid spring construction of this invention. To demonstrate the manner in which the invention fulfills these objects, two different embodiments of the invention are described in detail hereinafter and are illustrated in the drawing.

In the two embodiments of the invention illustrated, the spring comprises a generally cup-shaped cylindrical body which is formed with a chamber that is closed by a plug that is formed with a centrally disposed guide cylinder that opens into and extends into the chamber. The sidewall of the plug engages the chamber wall and extends outwardly from the chamber to form a cylinder having the same outer diameter as the plug and having a large central bore. The sidewall of the plug, including the cylinder, is brazed to the cup-shaped container over an area corresponding roughly to half the total inner surface area of the cup-shaped container, or slightly more.

A piston is mounted to reciprocate in the guide cylinder of the plug. It carries a seal which has liquid-tight engagement with the guide cylinder. The rod or stem of the piston projects outwardly out of the plug and terminates in a peripheral flange which is of considerably larger diameter than the piston rod and which has a broad outer bearing surface.

In one embodiment of the invention, the bearing surface of the peripheral flange engages the inner surface of the cylinder formed by the extended sidewall of the plug. A retainer cap nut is threaded around the cup-shaped container and has an internally directed flange ring adapted to engage the piston flange to limit outward reciprocal movement of the piston.

In the second embodiment of the invention illustrated, the inner surface of the plug sidewall cylinder is threaded, and a sleeve or bushing is threaded therein. The peripheral flange of the piston engages the inner surface of the sleeve, and the sleeve is provided with an internally directed annular flange adapted to engage the piston flange, to limit outward reciprocal movement of the piston.

In each embodiment of the invention, the piston is guided in its reciprocating movement by the wall of the guide cylinder on which the piston seal slides, and by the enlarged diameter bearing surface on which the piston flange slides. This insures proper alignment of the piston in the guide cylinder throughout the life of the spring. The long brazed joint which is provided in each case between the extended sidewall of the plug and the confronting portion of the container wall substantially obviates any possibility of the plug popping out of the container.

The details of the construction of the various embodiments of the invention may be best understood by consideration of the detailed description which follows, considered together with the drawing.

Figure 1:
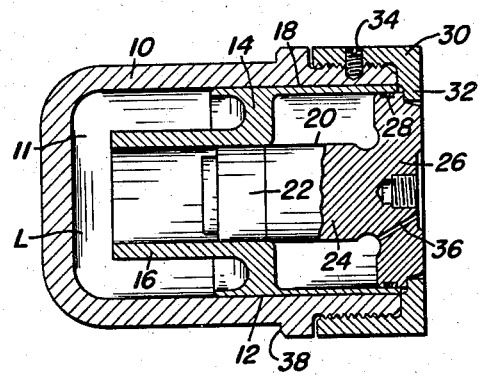
Fig. 1 is an axial section of a liquid spring constructed according to one embodiment of the invention.
Figure 2:
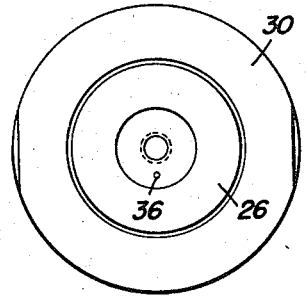
Fig. 2 is an end view thereof.

The spring shown in Figs. 1 and 2 of the drawing comprises a generally cup-shaped container 10 closed by a plug 12 mounted transversely in the container, to provide a chamber 11 which is adapted to be filled with a compressible solid or a compressible liquid L, such as a solid silicone or a silicone oil. The plug 12 is formed with a radial disc portion 14, a peripheral, cylindrical sidewall portion 18, and a centrally disposed, rearwardly-extending guide cylinder 16 that opens into the chamber 11, and extends a considerable distance therein, concentric with the bore of the container.

The sidewall portion 18 of the plug is extended forwardly of the disc portion 14 to provide an extended contact surface with the internal sidewall of the container 10. The sidewall of the plug is brazed to the container throughout its entire length, so that a brazed joint is obtained which extends over an extremely large area.

A piston 20 reciprocates in the guide cylinder 16 of the plug. The piston carries a seal 22 which has liquid-tight engagement with the guide cylinder. The rod or stem 24 of the piston 20 projects outwardly of the disc portion 14 of the plug and has at its end a cylindrical piston flange 26 of much greater diameter than the seal 22 and the rod 24 having a broad peripheral bearing face. A bushing 28 is peripherally mounted around the cylindrical piston flange 26 on its bearing face to engage and slide on the inner surface of the plug sidewall cylinder 18, thereby to align the piston flange 26 or head with the bore of the guide cylinder 16.

A retainer cap nut 30 is threaded around the outer open end of the container 10 and has an inwardly directed flange ring 32 which is adapted to engage the cylindrical flange 26 to limit outward reciprocal movement of the piston. The cap nut is additionally secured in place by a set screw 34 which extends through the wall of the cap nut and into the wall of the container 10.

The piston flange 26 has a duct 36 therethrough to permit the escape of air from the space between the piston flange 26 and the disc portion 14 of the plug during operation of the spring. Air that was trapped and compressed in this space could cause the bushing 28 to be blown out of its groove because of the increase in air pressure.

The cup-shaped container 10 has a radially-extending shoulder 38, and the spring is normally retained in a mounting by the shoulder when held in operating position in a gun mounting.

Figure 3:
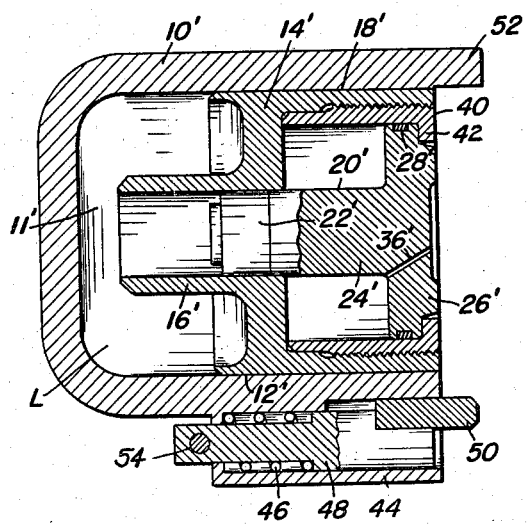
Fig. 3 is an axial section of a liquid spring constructed according to another embodiment of the invention, and showing means for securing the spring in a gun mounting.
Figure 4:
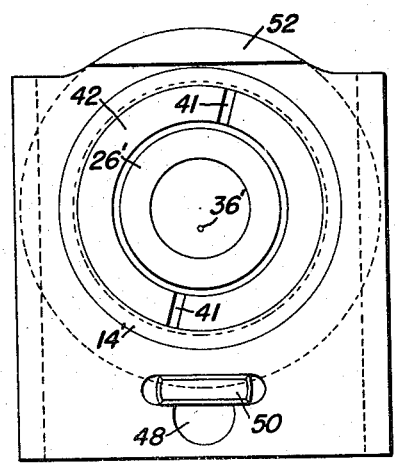
Fig. 4 is an end view thereof.

The embodiment of the invention illustrated in Fig. 3 is very similar to that shown in Fig. 1. The cup-shaped container 10' is closed by a centrally disposed plug 12' providing a chamber 11' adapted to contain a compressible solid or liquid L. The plug 12' has a radial disc 14' and is formed with a centrally disposed guide cylinder 16' that opens into the chamber.

The sidewall portion 18' of the plug is extended forwardly of the disc portion 14' to provide an extended contact surface with the internal sidewall of the container 10'. The sidewall of the plug is brazed over its entire area to the opposed inner surface of the container 10', providing a brazed joint between the plug and the container which extends over a large area.

A cylindrical sleeve 40 is removably threaded into the plug sidewall cylinder 18'. The inner surface of the sleeve 40 is smooth to provide a large-diameter bearing surface. The sleeve has an inwardly directed flange ring 42; and it has a pair of diagonally opposed, aligned slots 41 on its outer surface.

A piston 22' reciprocates in the guide cylinder 16' of the plug. The piston carries a seal 22' which has liquid-tight engagement with the guide cylinder. The rod or stem 24' of the piston projects outwardly of the plug to receive the load, and has at its load-receiving end a cylindrical flange 26' of considerably greater diameter than the piston rod 24' and than the seal 22'. A bushing 28' is mounted around the piston flange to engage and slide on the inner bearing surface of the cylindrical sleeve 40, thereby to align the piston head with the bore of the guide cylinder 16'. The piston flange 26' has a duct 36' therethrough to permit the escape of air from the space between the piston flange 26 and the disc portion 14' of the plug during operation of the spring.

The inwardly directed ring 42 on the cylindrical sleeve 40 is adapted to engage the piston flange to limit outward reciprocal movement of the piston.

The spring has a standard Navy Bureau of Ordnance lock mechanism and mounting equipment for positioning the spring in readily releasable fashion in a gun mounting, including a fixed lug 52 integrally extending from the container 10, and a retractible lug 50 mounted in the lock mechanism. The lock mechanism includes a cylinder 44 having a hollow bore open at one end, and flanged at the other end to provide a reduced opening. A bolt 48 is mounted in the open bore of the cylinder 44, and a spring 46 is interposed between the flanged end of the cylinder and the bolt. The retractible lug 50 is secured to the bolt 48 for movement upon movement of the bolt. The bolt 48 has an extension projecting through the flanged end of the cylinder 44, and a retainer pin 54 in the projecting end of the bore engages the flanged end of the cylinder to limit movement of the bolt.

In operaiton of the device shown in Fig. 1, the container 10 is seated and aligned in a mounting or installation adapter (not shown) and is normally retained therein by the shoulder 38 when held in operating position. The outer face of the piston flange 26 or head will be held in axial alignment with the path along which the gun body reciprocates by the inherent design of the spring that provides for proper guiding of the piston during its reciprocation, and by proper alignment of the spring container in its installation adapter. The compressive force is applied to the outer surface of the piston flange 26. The piston 20 is forced inwardly of the chamber 11, compressing the solid or liquid L. The piston and piston flange reciprocate as a unit, and any air which is trapped between the piston flange and the radial disc 14 of the plug 12 escapes through the duct 36 in the piston flange. Upon release of the compressive force, the compressed solid or liquid expands to force the piston outwardly of the chamber with considerable force. The outward movement of the piston is arrested by abutment of the piston flange 26 against the flange ring 32 on the cap retainer nut 30. The spring is then at its initial position and is ready for the application of another force.

During its reciprocal movement, the piston is guided in its reciprocating movement, and maintained truly centered in the bore of the guide cylinder, by the wall of the guide cylinder, on which the piston seal slides, and by the enlarged diameter bearing surface on which the piston flange slides.

Preload may be applied to the spring after the compressible liquid has been placed in the chamber during assembly of the spring, by forcing the piston 20 into the chamber by the cap nut 30. As the cap nut 30 is threaded into the body, the flange ring 32 engages the piston flange 26 and forces the piston into the chamber. After the desired preload has been applied, the set screw 34 is passed through the walls of the cap nut 30 and into the container wall to fix the position of the cap nut. The spring illustrated in Fig. 1 has the maximum preload applied thereto.

Operation of the embodiment of the invention illustrated in Fig. 3 is substantially similar. Outward reciprocal movement of the piston is arrested by abutment of the cylindrical piston flange 26' against the flange ring 42 which extends inwardly from the sleeve 40. The piston is guided in its reciprocating movement in the guide cylinder 16', and is maintained truly centered in the bore of the guide cylinder, by the wall of the guide cylinder on which the seal 22' slides, and by the inner wall of the sleeve 40 on which the enlarged diameter bearing surface 28' of the piston flange slides.

A primary advantage of this modification of the invention is that the sleeve 40 may be removed conveniently by an appropriate spanner inserted in the slots 41 on the outer surface of the sleeve. Replacement of the sleeve 40 may be desirable as the sleeve becomes worn from repeated reciprocation of the piston flange therein.

To seat the spring shown in Fig. 3 in the gun mounting, the lugs 50 and 52 are seated in receptive apertures therefor. For disassembly, the pin 54 is seized and pulled, so that the bolt 48 moves to compress the spring 46 and withdraw the lug 50. The spring is then easily slipped out of the mounting.

Preload may be applied to the spring shown in Fig. 3 during assembly of the spring. After the chamber has been filled with liquid, the piston is placed in sliding position in the guide cylinder, and the sleeve 40 is threaded into the piston sidewall cylinder 18'. The flange ring 42 engages the piston flange 26' and forces the piston into the guide cylinder and into the chamber. The spring shown in Fig. 3 has the maximum amount of preload applied thereto.

There has thus been provided a liquid spring having an improved bearing and guiding of the piston. The engagement between the seal and the guide cylinder, and between the piston flange and its bearing surface, eliminate any tendency of the piston to cock relative to the guide cylinder, and maintain the piston truly centered in the bore of the guide cylinder. These advantages are achieved by providing broad bearing surfaces on the seal and on the piston flange, for engagement with their respective bearing surfaces; by axial spacing of the seal and the piston flange; and by making the piston flange of considerably larger diameter than the seal. Thus, even minute deviations from true and proper alignment are eliminated.

The impact forces are applied to the spring over the relatively large area of the piston flange, thus producing a correspondingly low unit stress. This permits the use of light-weight metals for the piston and assists in producing a light-weight gun mounting.

While two specific embodiments of the invention have thus been described and illustrated, it will be appreciated by those skilled in the art that many other embodiments of the invention are possible which are within the scope and spirit of the invention. Thus, for example, the cylindrical piston flange may bear directly against the walls of the container, if desired, rather than against the inner surface of the plug sidewall cylinder or against the surface of a sleeve inserted therein. Other similar modifications will readily occur to those skilled in the art.

While the invention has been described in connection with specific embodiments thereof, then, it will be understood that it is capable of further modifications, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. A liquid spring comprising a body having an opening therein closed at one end, a plug disposed intermediate the ends of said opening and forming with the closed end a chamber, a body of compressible material selected from a group consisting of compressible liquids and compressible solids in said chamber, said plug being formed with a guide cylinder extending into said chamber, a piston which is reciprocable in said guide cylinder, said piston being movable inwardly of said chamber under load to compress said material and being movable outwardly by said material when said load is released and said material is permitted to expand, a sealing member carried on said piston engaging said guide cylinder, said piston having a stem extending outwardly of said guide cylinder and chamber, a flange on said stem of larger diameter than said sealing member, and means carried by said plug providing a bearing surface wholly within said body for said flange, said flange being reciprocable upon reciprocation of said piston and in engagement with said bearing surface.

2. A liquid spring comprising a body having an opening therein closed at one end, a plug disposed intermediate the ends of said opening and forming with the closed end a chamber, a body of compressible material selected from a group consisting of compressible liquids and compressible solids in said chamber, said plug being formed with a guide cylinder extending into said chamber, said plug having its sidewall tubularly and integrally extended axially from said chamber and secured to the wall of said body over their coextensive opposed surface areas, a piston which is reciprocable in said guide cylinder, said piston being movable inwardly of said chamber under load to compress said material and being movable outwardly by said material when said load is released and said material is permitted to expand, a sealing member carried on said piston engaging said guide cylinder, said piston having a stem extending outwardly of said cylinder and chamber, a flange on said stem of larger diameter than said sealing member, and means carried by said plug providing a bearing surface wholly within said body for said flange, said flange being reciprocable upon reciprocation of said piston and in engagement with said bearing surface.

3. A liquid spring comprising a body having an opening therein closed at one end, a plug disposed intermediate the ends of said opening and forming with the closed end a chamber, a body of compressible material selected from a group consisting of compressible liquids and compressible solids in said chamber, said plug being formed with a centrally disposed guide cylinder extending into said chamber, said plug having its sidewall tubularly and integrally extended axially from said chamber and secured to the wall of said body over their coextensive opposed surface areas, a piston which is reciprocable in said guide cylinder, said piston being movable inwardly of said chamber under load to compress said material and being movable outwardly by said material when said load is released and when said material is permitted to expand, a sealing member carried on said piston engaging said guide cylinder, said piston having a stem extending outwardly of said cylinder and chamber, a cylindrical flange having a broad peripheral bearing surface on said stem and of larger diameter than said sealing member, and means carried by said plug providing a cylindrical bearing surface wholly within said body for engagement by the peripheral bearing surface of said flange, said flange being reciprocable upon reciprocation of said piston and with its peripheral bearing surface in engagement with said cylindrical bearing surface.

4. A liquid spring comprising a body having an opening therein closed at one end, a plug disposed intermediate the ends of said opening and forming with the closed end a chamber, a body of compressible material selected from a group consisting of compressible liquids and compressible solids in said chamber, said plug being formed with a centrally disposed guide cylinder extending into said chamber, said plug having its sidewall tubularly and integrally extended axially from said chamber and secured to the wall of said body over their coextensive opposed surface areas, a piston which is reciprocable in said guide cylinder, said piston being movable inwardly of said chamber under load to compress said material and being movable outwardly by said material when said load is released and when said material is permitted to expand, a sealing member carried on said piston engaging said guide cylinder, said piston having a stem extending outwardly of said cylinder and chamber, a cylindrical flange having a broad peripheral bearing surface on said stem and having a larger diameter than said sealing member, means carried by said plug providing a cylindrical bearing surfaces wholly within said body for engagement by the peripheral bearing surface of said flange, said flange being reciprocable upon reciprocation of said piston and with its peripheral bearing surface in engagement with said cylindrical bearing surface, said flange having means permitting air to move freely from one side of the flange to the other, and means secured to said body adapted to limit outward reciprocal movement of said flange and piston.

5. A liquid spring comprising a body having an opening therein closed at one end, a plug disposed intermediate the ends of said opening and forming with the closed end a chamber, a body of compressible material selected from a group consisting of compressible liquids and compressible solids in said chamber, said plug being formed with a guide cylinder extending into said chamber, said plug having its sidewall tubularly and integrally extended axially from said chamber and secured to the wall of said body over their coextensive opposed surface areas, said extended sidewall having a hollow bore with a smooth inner surface wholly within said body to provide a bearing cylinder, a piston which is reciprocable in said guide cylinder, said piston being movable inwardly of said chamber under load to compress said material and being movable by said material when said load is released and said material is permitted to expand, a sealing member carried on said piston engaging said guide cylinder, said piston having a stem extending outwardly of said cylinder and chamber, a flange on said stem of larger diameter than said sealing member, said flange having a broad peripheral surface engaging said bearing cylinder, said flange being reciprocable upon reciprocation of said piston and with its broad peripheral surface engaging said bearing cylinder in guiding and sliding relation, and means secured to said body to engage said piston flange to limit outward reciprocal movement of said piston.

6. A liquid spring comprising a body having an opening therein closed at one end, a plug disposed intermediate the ends of said opening and forming with the closed end a chamber, a body of compressible material selected from a group consisting of compressible liquids and compressible solids in said chamber, said plug being formed with a guide cylinder extending into said chamber, said plug having its sidewall extended axially from said chamber and secured to the wall of said body over their coextensive opposed surface areas, said sidewall having a threaded hollow bore, a sleeve removably secured therein having an inner cylindrical bearing surface, a piston which is reciprocable in said guide cylinder, said piston being movable inwardly of said chamber under load to compress said material and being movable outwardly by said material when said load is released and said material is permitted to expand, a sealing member carried on said piston engaging said guide cylinder, said piston having a stem extending outwardly of said cylinder and chamber, a flange on said stem of larger diameter than said sealing member and having a broad peripheral bearing surface engaging the inner cylindrical bearing surface of said sleeve in sliding and guiding engagement, and means rigidly disposed with respect to said body to limit outward reciprocal movement of said piston.

References Cited in the file of this patent
UNITED STATES PATENTS

| | | |
|---|---|---|
| 2,650,820 | Levy | Sept. 1, 1953 |
| 2,660,984 | Zumwalt | Dec. 1, 1953 |
| 2,733,060 | Taylor | Jan. 31, 1956 |